(12) United States Patent
Hu et al.

(10) Patent No.: US 7,800,880 B2
(45) Date of Patent: Sep. 21, 2010

(54) EARTHING ARRANGEMENT

(75) Inventors: Lihua Hu, Derby (GB); David R Trainer, Derby (GB); Michael P Hirst, Derby (GB); Stuart Galloway, Edinburgh (GB)

(73) Assignee: Rolls-Royce plc, London (GB)

( * ) Notice: Subject to any disclaimer, the term of this patent is extended or adjusted under 35 U.S.C. 154(b) by 533 days.

(21) Appl. No.: 11/808,058

(22) Filed: Jun. 6, 2007

(65) Prior Publication Data

US 2007/0287306 A1    Dec. 13, 2007

(30) Foreign Application Priority Data

Jun. 9, 2006    (GB) ................................. 0611409.4

(51) Int. Cl.
*H02H 3/22* (2006.01)
*H02H 1/00* (2006.01)

(52) U.S. Cl. ..................................................... 361/111
(58) Field of Classification Search .................. 361/111
See application file for complete search history.

(56) References Cited

U.S. PATENT DOCUMENTS

| | | | | |
|---|---|---|---|---|
| 4,021,760 A | * | 5/1977 | Campi | ........................ 333/167 |
| 4,309,641 A | * | 1/1982 | Shepherd | ..................... 315/408 |
| 4,355,352 A | * | 10/1982 | Bloom et al. | ................... 363/16 |
| 5,666,255 A | | 9/1997 | Muelleman | |
| 5,852,558 A | * | 12/1998 | Julian et al. | ................... 363/132 |
| 5,930,130 A | * | 7/1999 | Katyl et al. | .................... 363/53 |
| 7,050,278 B2 | * | 5/2006 | Poulsen | ........................ 361/31 |
| 7,583,136 B2 | * | 9/2009 | Pelly | .......................... 327/551 |
| 2004/0114297 A1 | * | 6/2004 | Schmiederer et al. | ........ 361/118 |
| 2005/0237008 A1 | * | 10/2005 | Moisin | ......................... 315/291 |
| 2007/0268636 A1 | * | 11/2007 | Suzuki et al. | .................. 361/48 |

FOREIGN PATENT DOCUMENTS

| | | | |
|---|---|---|---|
| EP | 1 865 586 A2 | * | 12/2007 |
| GB | 2 393 021 A | | 2/2004 |
| JP | 2005203186 A | * | 7/2005 |

* cited by examiner

*Primary Examiner*—Ronald W Leja
(74) *Attorney, Agent, or Firm*—Jeffrey S. Melcher; Manelli Denison & Selter PLLC

(57) ABSTRACT

In a DC electrical power system used in an aircraft, an earthing arrangement is provided between electrical power supply rails in the form of a pair of capacitors with a mid electrical voltage earthing point, having an earthing path, in which electrical resistance is provided to limit electrical current flow and therefore allow continued operation despite the earth fault.

10 Claims, 2 Drawing Sheets

Prior Art Fig. 4
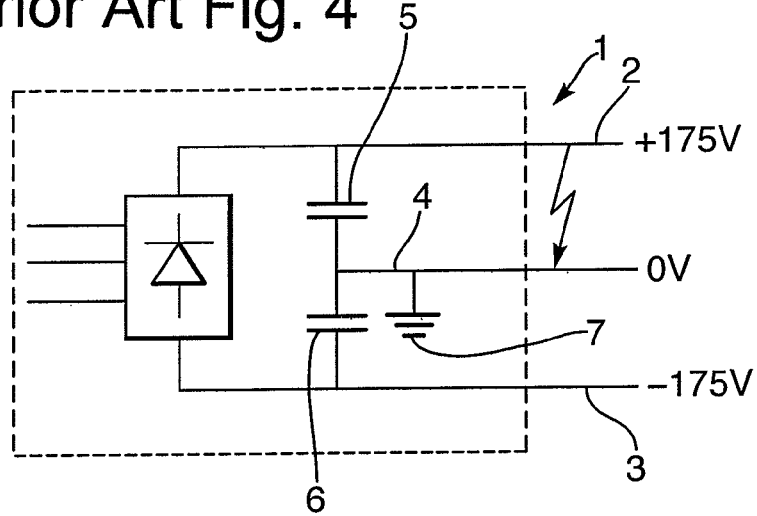
Fig. 1.
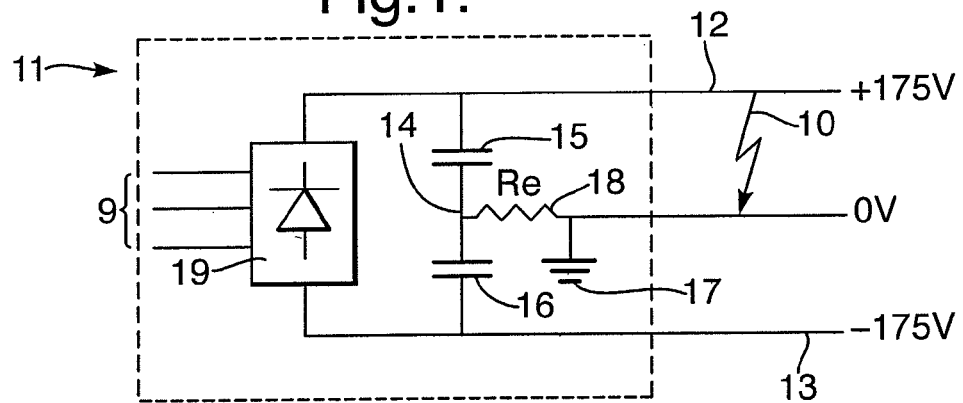
Fig. 2.
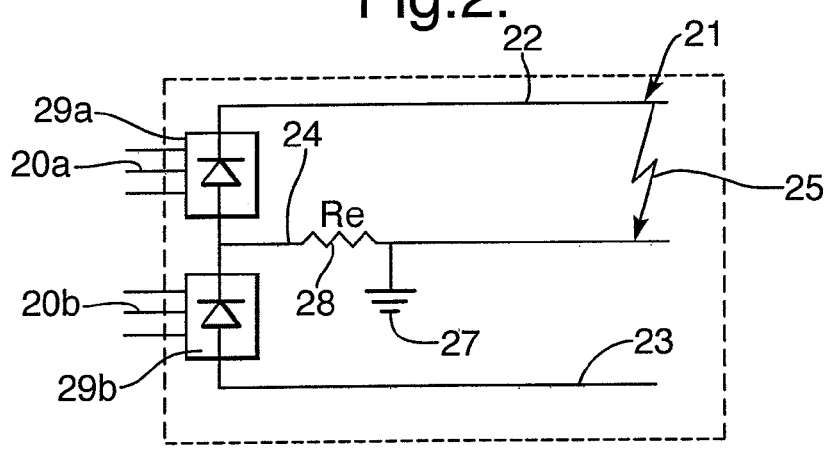

EARTHING ARRANGEMENT

BACKGROUND OF THE INVENTION

The present invention relates to an earthing arrangement and more particularly to earthing arrangements utilised with respect to DC electrical supply systems including electrical supply rails for an electrical power distribution network.

With regard to DC electrical power systems it is known to earth systems at a mid point of the DC power supply. The attached FIG. 4 marked "Prior Art", illustrates a typical known DC electrical power system 1 in which rails 2, 3 are presented at the exemplary voltages illustrated. An earthing path 4 is created between the rails 2, 3 with a pair of capacitors 5, 6 and an earthing point 7 midway between the capacitors 5, 6. Positioning the earthing point midway between the DC power supply rails reduces the insulation voltage levels in order to avoid corona and partial discharge as well as help minimise the possibility of insulation failure over the lifetime of the system. As indicated, the mid point earth point 7 is created by using two capacitors 5, 6 connected in series with the earthing point 7 tapped between these capacitors 5, 6 which themselves extend between the power supply rails.

With a two power rail or wire DC network the fault condition that practically exists is a short circuit between the two rail lines 2, 3. By earthing the system at the mid voltage level, two more fault possibilities are introduced, that is to say a positive rail 2 to ground fault and a negative rail 3 to ground fault. Under normal conditions, faults involving ground have a far greater probability than rail to rail faults because of insulation arrangements and clearances between the rails 2, 3. In such circumstances in electrical systems earthed at a mid voltage level there is more vulnerability to faults and the majority of these faults involve a short circuit between one rail 2, 3 and earth.

SUMMARY OF THE INVENTION

In accordance with aspects of the present invention there is provided an earthing arrangement for a DC electrical system, the arrangement comprising an earthing path comprising a first capacitance and a second capacitance with an earthing point between them, the earthing point having electrical resistance or electrical impedance to limit the electrical short current to earth.

Typically, the earthing path is provided between electrical power rails. Generally, the electrical power rails are arranged to provide equal but opposite electrical voltages with respect to earth.

Generally, the arrangement is configured so that if one rail short circuits to earth, the capacitance associated with that rail discharges whilst the other capacitance connected to the other rail and the earthing point charges to alter a voltage level for the arrangement with respect to earth. Typically, the arrangement includes a sensor to detect the voltage level. Possibly, the sensor provides an alarm to indicate variation in the common mode voltage level from an expected value.

Typically, the earthing path is coupleable to an external earthing point and the electrical resistance limits electrical short current due to any difference in the electrical potential of the earthing path and external earthing point.

BRIEF DESCRIPTION OF THE DRAWINGS

Embodiments of the present invention will now be described by way of example and with reference to the accompanying drawings in which:

FIG. 1 is a diagram illustrating a first earthing arrangement in accordance with aspects of the present invention;

FIG. 2 provides a schematic illustration of a second embodiment of an earthing arrangement in accordance with aspects of the present invention;

FIG. 4 is a diagram illustrating prior art earthing arrangements for DC electrical power systems.

DETAILED DESCRIPTION OF THE INVENTION

Figure 3:
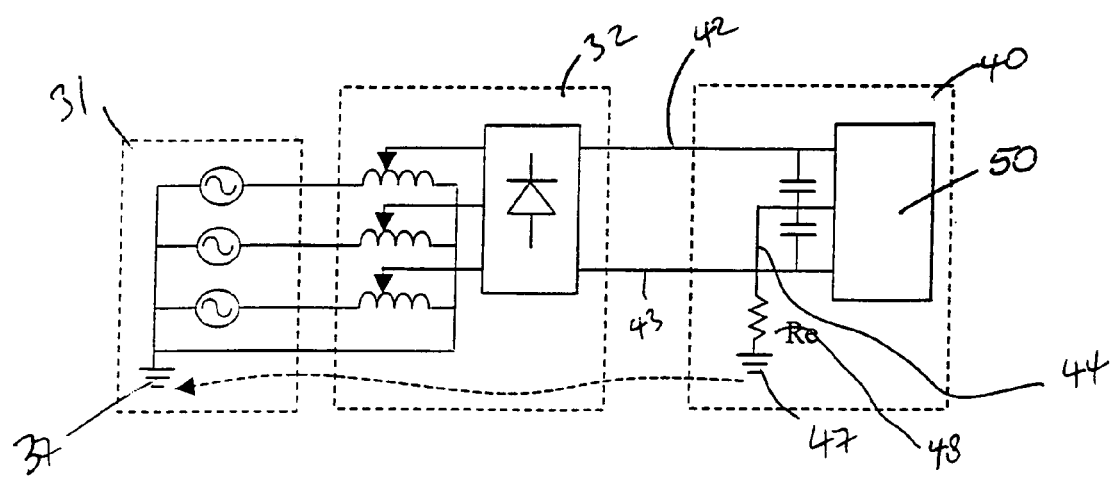
FIG. 3 provides a diagram of a third embodiment in accordance with aspects of the present invention.

As indicated above, previous earthing arrangements have effectively had a so called "solid earth" that is to say direct electrical connection to an earthing coupling or point from a mid point location between the capacitance of the earthing path. As illustrated in FIG. 1 in accordance with aspects of the present invention as previously, an earthing path 14 is provided comprising a first capacitance 15 and second capacitance 16 along with an earthing point 17. The earthing path 14 is secured between rails 12, 13 having respective generally equal but opposite electrical voltage values. The arrangement 11 provides power across a supply device 19 for parts of an electrical power system and other electrical devices.

In accordance with aspects of the present invention the earthing path 14 incorporates an electrical resistance 18. The effect of the electrical resistance 18 is that the implications of faults involving the earth can be minimised. Theoretically, under normal operational conditions all of the load current will flow in the two rails 12, 13 and no electrical current will flow in the earth path 14. In such circumstances the resistor 18 is earthed in the earth path and will not carry any current and thus will have no effect upon overall arrangement or electrical system operation. Practically, there will be a small leakage electrical current from the stray capacitance of the arrangement 11 flowing to ground 17 such that there will be a slight ac voltage across the resistor 18. This voltage will add to overall system voltage providing a common mode distortion. By selecting a relatively low resistance value and therefore voltage across the resistor 18, the voltage distortion can be minimised and the effects can be ignored.

In accordance with aspects of the present invention when a short circuit 10 occurs between one of the rails, in the example rail 12 and ground 17, the resistor 18 will be in the short circuit loop to limit the electrical current magnitude. The value of the resistor 18 is selected such that the circuit electrical current is far lower than the normal load electrical current and therefore no damage will result from the earth leakage fault 10. Whilst the capacitance 15 which is short circuited is discharging, the normally operating capacitor 16 will charge up to a full voltage level. Such charging will cause the arrangement to gradually return to normal operation but with the arrangement shifted and now referenced to one voltage level as the earth. In such circumstances, for a positive rail 12 to ground 17 fault to the arrangement the voltage will shift to minus 350 volts, whilst for a negative rail 13 to ground fault the shift will be to plus 350 volts.

It will be understood through an appropriate sensor that the changes in arrangement voltage level, that is to say positive to minus 350 volts and negative to plus 350 volts, can be easily detected and an appropriate alarm raised for appropriate attention. However, the voltage shift itself does not affect the overall function of the arrangement and in particular powering of electrical devices associated with the power generation and distribution system. In such circumstances the proposed earthing arrangement provides a degree of fault tolerance for continuing operation. It will be understood that an electrical source 9 supplying the arrangement 11 will continue to operate normally without knowing that the earth point has shifted. All the electrical loads between rails 12 and 13 will also operate normally unaffected by the earth point shift. Although this type of operation will be abnormal it will be understood it could be sustained for a relatively long period of time allowing the problem with respect to the earth leakage fault to be remedied without immediate shut down of the arrangement 11. Such fault tolerance will have particular advantages with respect to self contained power supply arrangements such as used in vehicles and in relation to engine powered electrical power generation systems or use within aircraft.

It will be understood that aspects of the present invention have particular applicability in relation to rail 12, 13 to earth 17 faults. However, it will be understood that more serious faults, that is to say rail to rail faults normally develop initially from a rail to ground fault. In such circumstances, by containing the rail to ground fault, it will be possible to repair the single failure in an arrangement 11 rather than a rail to rail fault which normally involves a double failure of the system and therefore is more difficult to remedy.

As indicated above, in normal operation the effect of inserting the resistor 18 into the earthing path at a middle point will not introduce any detrimental effects other than a small voltage caused by leakage current from stray capacitance in the arrangement. With the resistor 18 in service, the damage caused by earth faults in the arrangement 11, which can be a high proportion of in the order of 80% total fault probability in the arrangement will be virtually avoided. When a fault occurs, the arrangement can carry on operating normally for a relatively long period of time enabling an arrangement in accordance with the present invention as indicated to provide fault tolerance until a controlled or scheduled shut down and repair is possible. It will be appreciated that power distribution systems can be utilised in self contained environments such as a distribution system within a vehicle e.g. an air frame.

As indicated above, the electrical resistance provided in the earthing path in accordance with aspects of the present invention will depend upon particular requirements. In short, the electrical resistance provided within the earthing path is required to limit the electrical current magnitude as a result of a rail to earth fault. The resistor ensures that the circulating electrical current, that is to say passing through the electrical short for the rail to earth is held at a value far lower than the normal load currents flowing in rails 12 and 13 and so there is no damage. Furthermore, as indicated above, by aspects of the present invention the effective ground level is shifted so that with a positive rail to ground fault the positive rail effectively becomes zero and therefore the negative rail becomes the equivalent of the normal potential difference between the rails in the example given plus 175 volts to minus 175 volts giving, in such circumstances with the positive rail now grounded, a potential differential of minus 350 volts, that is to say the "differential" is unchanged. The differential value relative to earth has changed i.e. either "differential with respect to earth" or "absolute". In such circumstances loads applied across this voltage differential will still be operative normally for a relatively long period of time and, as indicated, therefore there will be a fault tolerance for the arrangement for a period of time until appropriate maintenance can be performed.

FIG. 2 illustrates an alternative embodiment of an earthing arrangement 21 in accordance with aspects of the present invention. Thus, in the arrangement 21 depicted in FIG. 2 power converters 29a, 29b are provided in order to provide electrical power to DC side through electrical power rails 22, 23. Earthing path 24 is provided from a middle voltage level between the sources 29a, 29b and has an electrical resistor. In such circumstances as previously, the arrangement in FIG. 2 only introduces small voltage distortion caused by stray capacitance within the DC system while an earth fault 25 between a rail 22 and an earth 27 will result in current being limited by the resistance 28 in the earthing path 24. In such circumstances as described previously, earth will then be displaced to one of the rails 22, 23. The voltage potential defined between the rails 22, 23 is retained for fault tolerance and operation for a relatively long period of time.

A further aspect of the present invention is illustrated with regard to FIG. 3. It will be understood that particularly in stand alone systems there may be periods when that system is coupled to a mains supply. For example, with respect to an aircraft incorporating an electrical supply system utilising an on board generator associated with an engine it will be understood that when that aircraft is on the ground the electrical power supply requirements for the aircraft may be fully or partially supplied by a ground power supply. The resistor utilised in accordance with aspects of the present invention in the earthing path may then be utilised to reduce interference problems between that ground power supply and the on-board electrical power supply system of the aircraft.

Typically, with a ground power supply there is normally earthing to a neutral point of its AC supply. FIG. 3 illustrates that situation with respect to a three phase electrical power generator 31. This AC power supply is connected to an on board auto-transformer rectifier unit 32 which in turn provides DC electrical power to rails 42, 43. These rails 42, 43 are also utilised as the electrical power distribution system for example in an aircraft utilising an engine 50 to generate the electrical power. It is likely in view of the considerations of weight in an aircraft the transformer rectifier unit on the aircraft will be of an auto transformer type which will not include galvanic isolation between primary and secondary coils of the transformer. In such circumstances the on board transformer-rectifier unit will not be earthed at any point.

When an aircraft is powered by the ground power supply 31, the earth point 37 will become the earth point for all electrical systems including that of the aircraft. In such circumstances the DC electrical distribution systems of the stand alone, that is to say aircraft system 40, becomes doubly earthed and the potential difference between earth point 37 and an earth point 47 will create a circulating current. Under normal operational conditions the impedance of the earth loop is low so that even a small potential between the earth point 37 and the earth point 47 can result in a significant electrical current. This earth electrical current may cause interference between systems and even lead to damage to both the ground generation system and the on board stand alone generating system.

In accordance with aspects of the present invention as described above, utilising a middle voltage level grounding path 44, the potential difference between the earthing points 37, 47 consists only the harmonics with zero phase sequence. For a solid earth system, that is to say without an electrical resistance 48, in accordance with aspects of the present invention, the circulating electrical current resulting from these harmonics could be high enough to cause interference such that normal operation cannot be maintained. By inserting the resistance 48 in the earth path 47, the electrical harmonic current circulating the earth system, that is to say between the earth points 37, 47, will be controlled to an acceptable level. Thus, the resistor 48 will allow normal operation of the generator 40 to continue with or without the ground electrical generator 31 contributing or connected to the rails 42 of a power distribution system.

Aspects of the present invention utilise the resistor in an earthing path to limit the electrical current in the circuit created by an earth fault, that is to say between a power distribution rail and the earth through the fault path as well as the capacitance between the rail and the mid voltage position of the earth point in the earth path. This allows the capacitance on one side to discharge whilst the other capacitor charges so that the arrangement is capable of continuing to operate but with the ground or earth level displaced to the earth faulted rail. This will result in a maintenance of the electrical potential differential between the rails and therefore allow continued operation as a power supply for a period of time. However, this displacement of the ground level will be detectable by a sensor and so an appropriate alarm or flag raised for maintenance at a suitable time.

As indicated above, generally the value of the electrical resistance provided in the earthing path will be dependent upon operational requirements. Typically, the resistance will be fixed but, where necessary, may be adjusted or can be adjustable in operation dependent upon control requirements.

We claim:

1. An earth fault protection arrangement for a DC electrical system, the arrangement comprising:
   an earthing path being provided between electrical power rails comprising a first capacitance and a second capacitance with an earthing point between them, the earthing point having fixed electrical resistance or electrical impedance to limit the electrical short current to earth, wherein the arrangement is configured so that if one rail short circuits to earth, the capacitance associated with that rail discharges whilst the other capacitance connected to the other rail and the earthing point charges to alter a voltage level for the arrangement with respect to earth.

2. An arrangement as claimed in claim 1 wherein the electrical power rails are arranged to provide equal but opposite electrical voltages with respect to earth.

3. An arrangement as claimed in claim 1 wherein the arrangement includes a sensor to detect a voltage level.

4. An arrangement as claimed in claim 3 wherein the sensor provides an alarm to indicate variation in the common mode voltage level from an expected value.

5. An arrangement as claimed in claim 1 wherein the earthing path is coupleable to an external earthing point and the electrical resistance limits electrical short current due to any difference in the electrical potential of the earthing path and external earthing point.

6. An arrangement as claimed in claim 1 wherein the electrical resistance is adjustable.

7. An arrangement according to claim 1, further comprising a resistor being arranged between said earthing point and a ground point.

8. A vehicle DC electrical system having earth fault protection comprising:
   first and second rails constructed and arranged to supply a DC current to electrical devices in which one of the rails has a negative voltage the other rail a positive voltage;
   at least two capacitors such that said capacitors are connected in series between said first and second rails; and
   an earthing point being arranged between said capacitors, the earthing point having fixed electrical resistance or electrical impedance to limit the electrical short current to earth, the system being configured so that if one rail short circuits to earth the capacitance associated with the short circuited rail discharges while the other capacitance connected to the other rail and the earthing point charges to alter a voltage level for the system with respect to earth so that the system can continue to supply DC current to the electrical devices during the short circuit.

9. A vehicle DC electrical system according to claim 8, further comprising a resistor being arranged between said earthing point and a ground point.

10. A vehicle DC electrical system according to claim 8, wherein the vehicle comprises an aircraft.

* * * * *